US000001901H

United States Statutory Invention Registration [19]

[11] Reg. Number: H1,901

Mason

[45] Published: Oct. 3, 2000

[54] FLAME RETARDANT CHEMICAL RESISTANT THERMOPLASTIC MOLDING COMPOSITION

[75] Inventor: James P. Mason, McKees Rocks, Pa.

[73] Assignee: Bayer Corporation, Pittsburgh, Pa.

[21] Appl. No.: 08/285,375

[22] Filed: Aug. 3, 1994

[51] Int. Cl.[7] ..... C08J 5/51

[52] U.S. Cl. ..... 524/144

[58] Field of Search ..... 524/144

[56] References Cited

U.S. PATENT DOCUMENTS

| | | | |
|---|---|---|---|
| 3,557,053 | 1/1971 | Miller | 260/45.7 |
| 4,677,148 | 6/1987 | Chung | 525/67 |
| 4,888,388 | 12/1989 | Hongo et al. | 525/67 |
| 5,266,618 | 11/1993 | Watanabe | 524/405 |

OTHER PUBLICATIONS

Flame Retarding Polybutylene Terephthalate–Properties, Processing Characteristics & Rheology, J. Green & J. Chung, Journal of Fire Sciences, vol. 8 Jul./Aug. 1990.

Flame Retarding Engineering Thermoplastics with Brominated Phosphate Ester, J. Green, Proceedings of Sixteenth International Conference on Fire safety, Jan. 14, 1991, Millbrae, Ca.

*Primary Examiner*—Charles T. Jordan
*Assistant Examiner*—Aileen J. Baker
*Attorney, Agent, or Firm*—Joseph C. Gil; Aron Preis

[57] ABSTRACT

A flame retardant thermoplastic composition having an improved level of chemical resistance is disclosed. The composition which contains about 1 to 14 pbw bromine, comprises (i) a bromine containing carbonate polymer, (ii) a thermoplastic polyester resin, (iii) a graft polymer, (iv) a phosphorous containing compound conforming to $$O{=}P{-}[{-}OCH_2C(CH_2Br)_3]_3$$

and optionally (v) polytetrafluoroethylene (herein PTFE).

12 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FLAME RETARDANT CHEMICAL RESISTANT THERMOPLASTIC MOLDING COMPOSITION

FIELD OF THE INVENTION

The invention concerns thermoplastic molding compositions and more particularly flame retardant compositions containing polycarbonates and polyesters.

SUMMARY OF THE INVENTION

A flame retardant thermoplastic composition having an improved level of chemical resistance is disclosed. The composition which contains about 1 to 14% by weight (pbw) bromine, comprises (i) a bromine containing carbonate polymer, (ii) a thermoplastic polyester resin, (iii) a graft polymer, (iv) a phosphorous containing compound conforming to $$O{=}P{-}[{-}OCH_2C(CH_2Br)_3]_3$$

and optionally (v) polytetrafluoroethylene (herein PTFE).

BACKGROUND OF THE INVENTION

Thermoplastic molding compositions containing polycarbonate, graft polymer, and polyalkylene terephthalate are known. Many such compositions have been disclosed in the patent literature. Mention may be made in this context of U.S. Pat. No. 4,888,388 which disclosed an impact resistant thermoplastic composition having distinguished surface appearance, color stability and thermal stability. The composition contains a particular graft rubber copolymer, polycarbonate and saturated polyester. A self extinguishing polycarbonate composition, stabilized against degradation and containing a halogenated phosphorous compound has been disclosed in U.S. Pat. No. 3,557,053. Also known are compositions which contain phosphorous compounds as additives, primarily as flame retarding agents. The combination of phosphorous compounds with halogenated additives has been disclosed to impart flame resistance to thermoplastic compositions. U.S. Pat. No. 5,276,077 is noted in this connection for its disclosure of an ignition resistant composition which contains polycarbonate, rubber modified monovinylidene aromatic copolymer and a rubbery core/shell graft copolymer impact modifier.

Also relevant in the present context are the following articles:

1. Flame Retarding Polybutylene Terephthalate—properties, processing characteristics and Rheology, by J. Green and J. Chung, Journal of Fire Sciences, Vol 8 —Jul./Aug. 1990, and
2. Flame Retarding Engineering Thermoplastics with Brominated Phosphate Esters, by J. Green, Proceedings of Sixteenth International Conference on Fire Safety, Jan. 14, 1991, Millbrae, Calif., and
3. Flame Retarding Polycarbonate/ABS Blends With a Brominated Phosphate, by J. Green, presented at the Fire Retardant Chemicals Association Meeting, Hilton Head, Mar. 20, 1991.

DETAILED DESCRIPTION OF THE INVENTION

The thermoplastic molding composition of the invention is characterized by its flame resistance and chemical resistance proved level of chemical resistance. The composition contains about 1 to 14%, preferably about 6 to 12% bromine, the percent being relative to the weight of the composition, and comprises (i) about 40 to 90, preferably 40 to 60% of a bromine-containing carbonate component, (ii) about 10 to 50, preferably 20 to 40% of a thermoplastic polyester resin, (iii) about 1 to 15, preferably 5 to 10% of a graft polymer, (iv) about 1 to 7, preferably 2 to 5% of a phosphorous containing compound conforming to $$O{=}P{-}[{-}OCH_2C(CH_2Br)_3]_3$$

and optionally (v) a positive amount up to 1%, preferably 0.05 to 0.4% of polytetrafluoroethylene (herein PTFE), the percents being relative to the weight of the composition.

The bromine-containing carbonate component in the present context is a carbonate polymer which contains the requisite amount of bromine. The requisite amount of bromine in the carbonate component is about 1.0 to 10.0, preferably about 4.0 to 7.0 percent relative to the weight of the carbonate component. The source of the requisite amount of bromine is as (a) bromine substituents of the dihydroxy compounds used in the preparation of the carbonate polymer, (b) an oligocarbonate compound additive, or (c) a combination of (a) and (b).

The thermoplastic carbonate component of the invention is essentially a polycarbonate resin which is well known and available in commerce. The method of preparation of polycarbonate resins has been disclosed in many publications (see in this regard German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y., 1964).

The homopolycarbonates suitable in the context of this invention have a weight average molecular weight of 10,000–200,000, preferably 20,000–80,000 and their melt flow rate, per ASTM D-1238 at 300° C., is about 1 to about 65 g/10 min., preferably about 2–15 g/10 min. These resins may be prepared, for example, by the known diphasic interface process from a carbonic acid derivative such as phosgene and at least one dihydroxy compound by polycondensation. In the present context, dihydroxy compounds suitable for the preparation of the polycarbonates of the invention conform to the structural formulae (1) or (2).

(1)

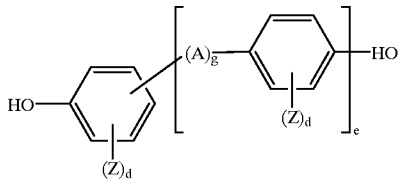

(2)

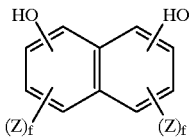

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —$SO_2$— or a radical conforming to

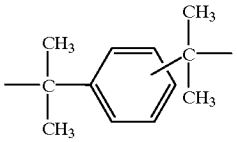

e and g both denote the number 0 to 1;

d denotes an integer of from 0 to 4; and f denotes an integer of from 0 to 3, and where Z denotes F Cl, Br or $C_1$–$C_4$-alkyl and if several Z radicals are substituents in one aryl radical, they may be identical or different from one another.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropylbenzenes. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2,-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The bromine-containing carbonates of the invention, embodiment (a) above, may entail in their structure units derived from one or more of bromine substituted suitable bisphenols.

In the embodiment of the invention which entails an oligocarbonate compound additive, (b) above, there is added to the carbonate polymer an amount of oligomeric bromine-containing carbonate (herein oligocarbonate). The suitable oligocarbonate has a weight average molecular weight of about 1,500 to 20,000, preferably 2,000 to 10,000 and may be prepared, for example, by the diphasic interface process from a carbonic acid derivative such as phosgene and a bromine substituted dihydroxy compound. The suitable bromine-substituted dihydroxy compound conforms to formula (1) above except that at least some of the substituents Z are bromine atoms.

A particularly suitable oligocarbonate containing 52% bromine, the percent being relative to the weight of the oligocarbonate, manufactured by Great Lakes Chemical Corporation, is a phenoxy terminated tetrabromobisphenol A carbonate oligomer, having a molecular weight of about 2,500.

In the carbonate component of the invention, both the bromine containing carbonates and the bromine-free resins may be branched. Branched resins and the means to attain branching are known—see in this regard German Offenlegungsschriften 1,570,533; 2,116,974 and 2,113,374; British Patents 885,442 and 1,079,821 and U.S. Pat. No. 3,544,514.

Suitable polycarbonate resins are available in commerce, for instance under the Makrolon trademark from Miles Inc. of Pittsburgh, Pa. and from Bayer AG of Leverkusen, Germany.

The thermoplastic polyester resin suitable in the context of the invention is well known and is readily available in commerce. Polyalkylene terephthalates, including polybutylene terephthalate and polyethylene terephthalate, preferably polyethylene terephthalate (herein PET) are among the suitable resins. Also suitable are the corresponding copolyesters, especially the copolyesters based on cyclohexane-dimethanol/ethylene glycol comonomers such as have been disclosed in U.S. Pat. Nos. 4,267,096; 4,786,692; 4,352,907; 4,391,954; 4,125,571; 4,125,572; and 4,188,314, the disclosures of which are incorporated herein by reference. In general the polyesters should have an intrinsic viscosity of about 0.6 to 1.2, and preferably 0.7 to about 1.2.

The graft polymer which is suitable in the present context is a product obtained by polymerization of monomers in the presence of prepolymers so as to cause grafting of a substantial portion of the monomers onto the prepolymeric base. The manufacture of graft polymers is known, see in this connection R. J. Ceresa "Block and Graft Copolymers", Butterworth, London, 1962. In principle, all graft polymers are suitable for the purposes of the instant invention, provided that they have rubber elastic properties and that their glass transition temperature is below about −20° C. Of particular usefulness in the present context are the graft polymers which are commonly referred to as ABS resins and the acrylate rubber based grafts.

The ABS (acrylonitrile - butadiene - styrene) graft of the invention is a resin which is characterized in a butadiene content of about 60 to 90%, preferably 70 to 80%, and particle size of about 2 to 6 microns, preferably 3 to 5 microns.

Essentially the moieties of ABS graft polymers consist of two or more polymeric parts of different compositions chemically united. The graft polymers may be prepared by polymerizing at least one conjugated diene, such as butadiene or a conjugated diene with a monomer polymerizable therewith, such as styrene, to provide a backbone, with subsequent polymerization of at least one grafting monomer, and preferably two, in the presence of the prepolymerized backbone to complete the graft polymer.

The backbone, as mentioned, is preferably a conjugated diene polymer or copolymer such as polybutadiene, butadiene-styrene, butadiene-acrylonitrile or the like.

Examples of the monovinyl aromatic compounds and substituted monovinyl aromatic compounds that may be used are styrene and other vinyl-substituted aromatic compounds including alkyl-, cyclo-, aryl-, alkaryl-, alkoxy-, aralkyl-, aryloxy-, and other substituted vinyl aromatic compounds. Examples of such compounds are 3-methyl-styrene; 3,5-diethylstyrene and 4-n-propylstyrene, α-methylstyrene, α-methyl-vinyl-toluene, α-chlorostyrene, vinyltoluene, α-bromostyrene, chlorophenyl ethylenes, dibromophenyl ethylenes, tetrachlorophenyl ethylenes, 1-vinylnaphthalene, 2-vinylnaphthalene, mixtures thereof and the like. The preferred monovinyl aromatic hydrocarbon used herein is styrene and/or α-methylstyrene.

The second group of monomers that are polymerized in the presence of the prepolymerized backbone are acrylonitrile, substituted acrylonitrile and/or acrylic acid esters exemplified by acrylonitrile and alkyl acrylates such as methylmethacrylate. Examples of monomers of this description, i.e., acrylonitrile, substituted acrylonitrile, or acrylic acid esters of the above formula are acrylonitrile, ethane acrylonitrile, methacrylonitrile, α-chloroacrylonitrile, β-chloroacrylonitrile, α-bromoacrylonitrile and β-bromoacrylonitrile, methacrylate, methyl-methacrylate, ethylacrylate, butylacrylate, propylacrylate, isopropylacrylate, isobutylacrylate, mixtures thereof and the like. The preferred acrylic monomer used herein is acrylonitrile and the preferred acrylic acid esters are ethylacrylate and methylmethacrylate.

In the preparation of the graft polymer, the conjugated diolefin polymer or copolymer exemplified by 1,3-butadiene polymer or copolymer comprises 60 to 90% by weight, preferably 70 to 80% by weight of the total graft polymer composition and the monomers polymerized in the presence of the backbone exemplified by styrene and acrylonitrile comprise about 10 to 40%, preferably 20 to 30% by weight of the total graft polymer composition.

The preparation of suitable ABS resins is described in U.S. Pat. No. 3,852,393, the disclosure of which is incorporated herein by reference.

Suitable ABS graft resins are known in the art and are readily obtainable in commerce.

The acrylate graft polymers which are suitable in the practice of the invention are the acrylic rubber interpolymer composites which are described in U.S. Pat. Nos. 3,808,180, 4,096,202, and 4,022,748 which are incorporated by reference herein. Briefly these compounds contain about 25 to 95% by weight of a first elastomeric phase and about 75 to 5% by weight of a second, rigid, thermoplastic phase. The first phase is polymerized from about 75 to 99.8% by weight $C_{1-6}$ acrylate resulting in an acrylic rubber core having a glass transition temperature below about 10° C. which is cross-linked with 0.1 to 5% by weight of a cross-linking monomer and to which is added 0.1 to 5% by weight of a graft-linking monomer.

The preferred alkyl acrylate is butyl acrylate. The cross-linking monomer is an ethylenically unsaturated monomer having a plurality of additional polymerizable reactive groups all of which polymerize at substantially the same rate of reaction. Suitable cross-linking monomers include acrylic and methacrylic esters of polyols such as butanediol diacrylate and dimethacrylate, trimethylol propane trimethacrylate and the like; di- and trivinyl benzene, vinyl acrylate and methacrylate, and the like. The preferred cross-linking monomer is butanediol diacrylate. The graft-linking monomer is an ethylenically unsaturated monomer having a plurality of additional polymerizable reactive groups, at least one of which polymerizes at a substantially different rate of polymerization from at least one other of said reactive groups. The function of the graft-linking monomer is to provide a residual level of unsaturation in the elastomeric phase, particularly, in the latter stages of polymerization and, consequently, at or near the surface of the elastomer particles. The preferred graft-linking monomers are allyl methacrylate and diallyl maleate.

The final stage monomer system can be comprised of $C_{1-16}$ alkyl methacrylate, styrene, acrylonitrile, alkyl acrylates, allyl methacrylate, diallyl methacrylate, and the like, as long as the Tg is at least about 20° C. Preferably, the final stage monomer system is at least 50 weight % $C_{1-4}$ alkyl methacrylate. It is further preferred that the final stage polymer be free of units which tend to degrade polycarbonate.

In a preferred embodiment of the present invention the acrylate graft polymer is an acrylic rubber inter-polymer composite which is available commercially from the Rohm & Haas Corporation, Philadelphia, Pa., under the trade name Paraloid KM-2330. That modifier is characterized in that its acrylic rubber core comprises n-butyl acrylate and in that its cross-linking agent is 1,3-butanediol diacrylate, and in that its graft-linking agent is diallyl maleate and in that the second phase monomer is methyl methacrylate.

A yet additional preferred embodiment is represented by a core/shell graft polymer which is based on a siloxane and poly n-butylacrylate core with a poly n-butylacrylate-methylmethacrylate shell. This graft is produced by (i) emulsion polymerization of cyclosiloxanes with multifunctional crosslinking agents to produce a polydimethylsiloxane rubber (PDMS) which is (ii) incorporated into a poly n-butylacrylate matrix forming an interpenetrating network (IPN), which is the core of the core shell modifier, and (iii) methyl methacrylate is then grafted on the IPN thus forming the shell. A more complete description of this embodiment is included in U.S. Pat. No. 4,888,388, the specification of which is incorporated herein by reference.

Tetrafluoroethylene polymers suitable in the present inventive composition are known. These are the ones which are adapted to form a fibril structure to reduce the tendency of the polymer to drip when under molten conditions. Such polymers are often referred to as PTFE or Teflon—see for instance U.S. Pat. Nos. 3,005,795; 3,671,487 and 4,463,130, the specifications of which are incorporated herein by reference. The most suitable PTFE has high elastic memory, examples of such most suitable PTFE resins are Teflon 6c, 60, 64, 6CN, 65 and 67.

Conventional additives may be incorporated in the thermoplastic composition of the invention in the conventional, functional amounts. The following are suitable additives: Fillers such as, for example, mineral fillers, plasticizers, fluidizing agents, stabilizers against UV light, heat, moisture and the action of oxygen, pigments and flame-retardants. Also suitable are fiber reinforcing agents, including glass fibers and the like. Combining the components of the inventive composition follows conventional means and procedures. Dry mixing of the components generally followed by melt blending and extrusion precedes the formation of pellets.

The invention is further illustrated but is not intended to be limited by the following examples in which all parts and percentages are by weight unless otherwise specified.

EXAMPLES

Experimental:

Compositions in accordance with the invention have been prepared and their properties determined. In preparing the compositions, conventional and well known procedures and means were used. The components of the compositions were as follows:

The halogenated polycarbonate used was a blend of brominated polycarbonate (a copolycarbonate of bisphenol-A and tetrabromo-bisphenol-A, having a bromine content of about 5% by weight) and a oligomer of brominated carbonate containing about 52% by weight of bromine. In the control composition, the amounts of the brominated polycarbonate resin and oligocarbonate were 46 and 9% respectively and in the composition of the invention the corresponding amounts were 51% and 6%, the percents being relative to the weight of the composition. The bromine content in the compositions, both the "Control" and the "Inventive Composition" was about 8.3 percent by weight.

The polyalkylene terephthalate resin used in the compositions was polyethylene terephthalate having an intrinsic viscosity of about 0.90.

The graft polymer was ABS which contains 75% polybutadiene graft base and 25% of a grafted shell of styrene-acrylonitrile. Although not critical to the invention, PTFE may be added to some flame retardant versions of the inventive compositions. PTFE in the form of a concentrate in ABS was added to the examples which are described below. To both the Inventive Composition and to the Control, a small amount of concentrate containing 10% PTFE and 90% ABS was added.

The control example contained triphenyl phosphate and in contrast, the inventive composition contained Kronitex PB370-tribromoneopentyl phosphate. Table 1 describes the compositions and Tables 2 and 3 contain a summary of the results of their properties. The criticality of the phosphate compound of the invention in imparting to the composition surprising and unexpected properties is clearly demonstrated.

TABLE 1

| | Control | Inventive Composition |
|---|---|---|
| Halogenated Polycarbonate | 55 | 56 |
| PET | 31 | 31 |
| ABS | 9.9 | 9.9 |
| PTFE | 0.1 | 0.1 |
| Phosphate Compound | 4[a] | 3[b] |

[a]Triphenyl phosphate
[b]tribromoneopentyl phosphate

The compositions were evaluated as to their respective tensile elongation (%) values after immersion for 24 hours in the indicated agent, at 73° F. under 0.75% outer fiber strain. The results are shown in Table 2 below.

TABLE 2

| | Tensile Elongation, (%) | |
|---|---|---|
| | Control | Inventive Composition |
| Control | 82 | 124 |
| 3% sulfuric acid | 2 | 16 |
| water displacement lubricant[1] | 91 | 134 |
| 0.2% sodium hydroxide | 59 | 113 |
| kerosene | 3 | 73 |
| splice encapsulant[2] | 8 | 102 |
| filling compound[3] | 41 | 107 |

[1]WD40, a product of WD40 company.
[2]Cschem 165, a product of Chaschem.
[3]Flexgel 65° C., a product of Witco Chemical Company.

The critical strain values of the control composition and the composition of the invention are presented in Table 3 below.

TABLE 3

| | Critical Strain (%) | |
|---|---|---|
| | Control | Inventive Composition |
| wasp spray[4] | 0.4 | 1.2 |
| corrosion wash[5] | 0.4 | 1.4 |
| service wire filing compound[6] | 0.6 | 1.4 |

[4]Black Flag, a product of Boyle Midway Household Products.
[5]Rainbow, a product of Rainbow Technology Corporation.
[6]Witcogel II, a product of Witco Chemical Company.

Both compositions have a flammability rating of V-0 for specimens having a thickness of 0.062" and 5VA rating for specimens having a thickness of 0.120".

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising (i) about 40 to 90% bromine-containing carbonate component, (ii) about 10 to 50% thermoplastic polyester resin, (iii) about 1 to 15% graft polymer, (iv) about I to 7% compound conforming to $$O{=}P{-}[{-}OCH_2C(CH_2Br)_3]_3$$

and optionally (v) a positive amount up to 1% polytetrafluoroethylene, said composition containing bromine in an amount of about 1 to 14%, said percents being relative to the weight of the composition, said carbonate component containing bromine in an amount of about 1.0 to 10.0 percent relative to its weight.

2. A thermoplastic molding composition comprising (i) about 40 to 60% bromine-containing carbonate component, (ii) about 20 to 40% thermoplastic polyester resin, (iii) about 5 to 10% graft polymer, (iv) about 2 to 5% compound conforming to $$O{=}P{-}[{-}OCH_2C(CH_2Br)_3]_3$$

and (v) about 0.05 to 0.4% polytetrafluoroethylene, said composition containing bromine in an amount of about 1 to 14%, said percents being relative to the weight of the composition, said carbonate component containing bromine in an amount of about 1.0 to 10.0 percent relative to its weight.

3. The composition of claim 1 wherein said composition contains about 6 to 12% bromine.

4. The composition of claim 2 wherein said composition contains about 6 to 12% bromine.

5. The composition of claim 3 wherein said carbonate component contains about 4.0 to 7.0% bromine.

6. The composition of claim 4 wherein said carbonate component contains about 4.0 to 7.0% bromine.

7. The composition of claim 1 wherein thermoplastic polyester is polyethylene terephthalate.

8. The composition of claim 1 wherein graft polymer is ABS resin.

9. The composition of claim 1 wherein thermoplastic polyester is polyethylene terephthalate resin and graft polymer is ABS resin.

10. The composition of claim 1 wherein said graft polymer has an acrylate rubber graft base.

11. The composition of claim 1 wherein said graft polymer has a core shell structure.

12. The composition of claim 1 wherein said graft polymer has an acrylate-siloxane rubber graft base.

* * * * *